(12) United States Patent
Orizio et al.

(10) Patent No.: US 12,524,532 B2
(45) Date of Patent: Jan. 13, 2026

(54) PROTECTING COMPUTER SYSTEMS

(71) Applicant: Rockwell Collins, Inc., Cedar Rapids, IA (US)

(72) Inventors: Riccardo Orizio, Cork (IE); Hector Palop Bauzá, Cork (IE); Stylianos Basagiannis, Penrose Wharf (IE); Gregory W. Rice, Cedar Rapids, IA (US)

(73) Assignee: Rockwell Collins, Inc., Cedar Raids, IA (US)

( * ) Notice: Subject to any disclaimer, the term of this patent is extended or adjusted under 35 U.S.C. 154(b) by 138 days.

(21) Appl. No.: 18/388,633

(22) Filed: Nov. 10, 2023

(65) Prior Publication Data

US 2024/0160731 A1    May 16, 2024

(30) Foreign Application Priority Data

Nov. 14, 2022  (EP) .................................. 22386082

(51) Int. Cl.
*G06F 21/55*  (2013.01)
*G06N 20/00*  (2019.01)

(52) U.S. Cl.
CPC .......... *G06F 21/554* (2013.01); *G06N 20/00* (2019.01); *G06F 2221/034* (2013.01)

(58) Field of Classification Search
CPC ............. G06F 21/554; G06F 2221/034; G06F 2201/88; G06F 11/30; G06F 11/3409; G06F 11/3447; G06F 11/348; G06F 21/55; G06F 21/552; G06N 20/00
See application file for complete search history.

(56) References Cited

U.S. PATENT DOCUMENTS

| | | | |
|---|---|---|---|
| 10,025,929 B2 * | 7/2018 | Sethumadhavan | .... G06N 20/00 |
| 10,419,468 B2 * | 9/2019 | Glatfelter | ............ H04W 12/122 |
| 10,778,720 B2 * | 9/2020 | Lee | ........................ H04L 9/3247 |
| 11,265,235 B2 * | 3/2022 | Kondapalli | ........... H04L 43/067 |
| 2016/0275288 A1 * | 9/2016 | Sethumadhavan | ... H04L 9/3239 |

(Continued)

FOREIGN PATENT DOCUMENTS

WO    2022093241 A1    5/2022

OTHER PUBLICATIONS

European Patent Office, European Search Report received in EP Patent Application No. 22386082.6, Apr. 26, 2023, 7 pages.

*Primary Examiner* — J. Brant Murphy
(74) *Attorney, Agent, or Firm* — Suiter Swantz IP

(57) ABSTRACT

A computer-implemented method of training a software agent for protecting a computer system includes receiving performance monitoring counter (PMC) data, including data from one or more hardware performance monitoring counters (PMCs) of the computer system, and receiving an output from an anomaly detector that is arranged to detect anomalies in the computer system. State data, including at least the PMC data, is provided to the software agent which selects a security policy from a set of security policies in dependence upon the state data, and applies the selected security policy to the computer system. A reward function is evaluated to determine a reward value which depends on at least the output of the anomaly detector. The reward value is used to train the software agent using reinforcement learning for selecting security policies from the set of security policies.

20 Claims, 3 Drawing Sheets

(56) References Cited

U.S. PATENT DOCUMENTS

| | | | |
|---|---|---|---|
| 2016/0366185 A1* | 12/2016 | Lee | H04L 63/20 |
| 2017/0091454 A1* | 3/2017 | Sukhomlinov | G06F 21/566 |
| 2019/0020669 A1* | 1/2019 | Glatfelter | H04W 12/122 |
| 2020/0076715 A1* | 3/2020 | Kondapalli | H04L 43/067 |
| 2020/0134180 A1* | 4/2020 | Lal | G06N 5/04 |
| 2020/0372366 A1* | 11/2020 | Badia | G06N 3/088 |
| 2022/0091960 A1* | 3/2022 | Ghosh | G06F 11/302 |

\* cited by examiner

PROTECTING COMPUTER SYSTEMS

CROSS-REFERENCE TO RELATED APPLICATIONS

The present application claims the benefit of European Patent Application No. 22386082.6, entitled Protecting Computer Systems, filed Nov. 14, 2022, which is incorporated by reference in the entirety.

TECHNICAL FIELD

The present disclosure relates to methods, software and systems for protecting computer systems.

BACKGROUND

Computer systems can be vulnerable to malicious attacks, as well as being subject to faults caused by hardware failures or software bugs. All of these can have serious implications, especially in safety-critical contexts such as aircraft control systems.

Software can be used to detect anomalous behavior in a computer system that may be indicative of an attack or a fault, and to signal an alert to a user. In some contexts, however, such as in embedded systems, a user may not be available to take appropriate action to mitigate the risk from such an attack or fault.

It is therefore desired to provide an improved approach to protecting computer systems.

SUMMARY

In a first aspect, there is provided a computer-implemented method of training a software agent for protecting a computer system, the method including receiving performance monitoring counter (PMC) data comprising data from one or more hardware performance monitoring counters (PMCs) of the computer system; receiving an output from an anomaly detector that is arranged to detect anomalies in the computer system; providing state data to the software agent, wherein the state data comprises at least the PMC data; operating the software agent to select a security policy from a set of security policies in dependence upon the state data; applying the selected security policy to the computer system; evaluating a reward function to determine a reward value, wherein the reward value depends on at least the output of the anomaly detector; and using the reward value to train the software agent using reinforcement learning for selecting security policies from the set of security policies.

The software agent may learn to select an optimal security policy that reduces the incidence of anomalous behavior in the computer system. The training agent may then be used to protect computer systems from attacks and/or faults in real-time, i.e., without requiring the involvement of a user to respond when a potential threat is detected. At least in some examples, the software agent may also be able to analyze and use the PMC data to select security policies more effectively than a human user could.

In a second aspect, there is provided computer software comprising instructions which, when executed, train a software agent for protecting a computer system by: receiving an output from an anomaly detector that is arranged to detect anomalies in the computer system; providing state data to the software agent, wherein the state data comprises at least the PMC data; operating the software agent to select a security policy from a set of security policies in dependence upon the state data; applying the selected security policy to the computer system; evaluating a reward function to determine a reward value, wherein the reward value depends on at least the output of the anomaly detector; and using the reward value to train the software agent using reinforcement learning for selecting security policies from the set of security policies.

In a third aspect, there is provided computer software for protecting a computer system, wherein the computer software comprises instructions which, when executed, provide a software agent that has been trained by a method of training as disclosed herein. (This software agent may be a copy of an original software agent generated during a training process.)

The software agent may comprise instructions for: receiving state data comprising at least performance monitoring counter (PMC) data comprising data from one or more hardware performance monitoring counters (PMCs) of a computer system; and selecting, in dependence upon the received state data, a security policy for applying to the computer system from the set of security policies.

The computer system protected by the software agent may be the selfsame computer system on which the software agent was trained, or it may be a second computer system which may similar or identical to the computer system on which the software agent was trained.

In a fourth aspect, there is provided a computer system comprising one or more hardware performance monitoring counters (PMCs) and further comprising a memory storing computer software comprising instructions which, when executed, provide a software agent as disclosed herein for protecting the computer system.

The computer system may include one or more processors, each of which may include one or more cores. The PMC data may include data from a respective set of one or more hardware PMCs of each of one or more processors or cores of the computer system. Hardware performance monitoring counters (PMCs, or also sometimes referred to as hardware performance counters (HPC) or simply hardware counters) are special-purpose registers built into microprocessors that store the counts of hardware-related activities within the computer system, such as the number of cache misses that have occurred since the counter was last sampled. The PMC data may include PMC values from one or a plurality of processor cores of the computer system. The PMC data may include a set of one or more PMC values, each PMC value being obtained from a different respective hardware PMC. It may include PMC data relating to any one or more of: cache access; RAM access; branch prediction; or bus timing; or any other type of PMC data available on the computer system.

The selected security policy may affect one or more cores or processors of the computer system. It may affect at least one processor from which at least some of the PMC data was received. It may restrict the performance of at least one processor. In this way, a security policy may reduce or negate the impact of an attack or fault, especially if the attack or fault only affects a part of the computer system, such as one processor core or memory region. Applying the selected security policy may include shutting down or throttling the performance of a core or processor of the computer system. Applying the selected security policy may include preventing or limiting access to a portion of memory, such as a region of cache memory (e.g., L1 or L2 cache) or other shared resources of the computer system. Each security policy may include one or a plurality of individual actions (e.g., throttling one or more cores and/or restricting access to L2 cache), such that implementing a security policy may include implementing a set or sequence of multiple actions. The set of security policies may include any number of different security policies, at least some of which may directly or indirectly limit the maximum performance of at least one processor of the computer system. One or more of the security policies may restrict performance of the computer system relative to performance of the computer system under a further one or more of the security policies. The software agent may learn to restrict performance of the computer system when the received state data is indicative of a threat, and may learn to increase performance when the state data does not indicate a threat.

The anomaly detector may be of conventional or novel design. It may be configured to detect one or more different types of hardware or software attacks or faults (e.g., a side-channel attack). It may include hardware, but in some examples it is a software anomaly detector—e.g., implemented wholly or partly in software. It may be arranged to receive data from one or more hardware PMCs of the computer system. It may receive data from a same or overlapping set of PMCs as the PMCs from which the state data is obtained. It may process the data to detect anomalies. The anomaly detector may detect anomalies (i.e., anomalous behavior) using a signature-based or threshold-based heuristic algorithm, or it may be a trained machine-learning model. It may be trained using an explainable constraint-based learning technique. It may include a Bayes model, or a neural network, or other deep network, or an ensemble of models. The anomaly detector may be trained independently from (e.g., prior to) the training of the software agent. The anomaly detector may output a binary indication of whether an anomaly has been detected since a security policy selected from the set of security policies was applied. It may output a count of how many anomalies have been detected since a selected security policy was applied. The output of the anomaly detector may include information relating to a type of anomaly that has been detected. Such information can be very helpful for training the agent to identify the best policies to enforce on the system. The reward value may depend upon a count of detected anomalies and/or on what type of anomaly or anomalies have been detected by the anomaly detector.

The state data provided to the software agent may additionally include an output of the anomaly detector. This may be a same output that is used for evaluating the reward function. It may include information relating to what type of anomaly or anomalies have been detected by the anomaly detector. The software agent may use the output of the anomaly detector in addition to the PMC data for selecting the security policy from the set of security policies. This can allow the agent to harness the expertise of the anomaly detector for detecting anomalies, rather than attempting to learn to do this itself, thereby allowing the agent to be better trained how to select optimal security policies.

The computer software that provides the trained software agent may additionally include the anomaly detector (which may be a copy of the anomaly detector code used in the training), and the software agent may include instructions for selecting the security policy for applying to the computer system in dependence upon both the received PMC data and an output of the anomaly detector.

The software agent may be trained using a first computer system during a training phase. The software for training the software agent may be executed on the computer system that the software agent is being trained to protect, or it may be executed at least partly on a different (e.g., more powerful) processing system. It may then be deployed to protect the first computer system, or a second similar or identical computer system, in a deployment phase. It will be appreciated that many copies of the trained software agent may be produced, and different copies may be deployed on different computer systems, e.g., across a fleet of aircraft, thereby efficiently protecting a large number of similar or identical computer systems. The computer software providing the software agent may include instructions for execution by one or more processors of the computer system that the software agent is protecting, or it may be executed on a separate processing system (e.g., on a monitoring system that is distinct from, but communicatively coupled to, the computer system that the software agent is protecting).

In some examples, the software agent may be continuously trained, using reinforcement learning, even after the software agent has been deployed. The software agent may be further trained while it is protecting the computer system. Computer software comprising instructions for providing the (trained) software agent may additionally include instructions for further training the software agent while the software agent is protecting the computer system.

The software agent may implement a machine-learning model of any appropriate type. It may include a deep neural network. In some examples, it includes a Deep Q-Network (DQN), which may be quantized. A quantized DQN may be particularly appropriate for executing on a resource-constrained embedded system.

The software agent may be trained over a plurality of training iterations. The state data may be updated at least or exactly once every training iteration. An output may be received from the anomaly detector at least or exactly once every training iteration. The reward function may be evaluated at least or exactly once every training iteration. The software agent may select at least or exactly one security policy to be applied in each training iteration. In some examples, each of these steps is done exactly once in each training iteration, while in other examples one or more of these steps may be performed multiple times in a single training iteration.

The reward value may be an immediate reward value determined for a respective training iteration. The reward function may be such that the reward value is negatively correlated with how many anomalies have been detected by the anomaly detector (e.g., since a security policy selected from the set of security policies was applied to the computer system). It may be a function of an integer value of the number of detected anomalies, or of a binary value such that 0 indicates no anomalies and 1 indicates one or more anomalies. The reward function may be such that the reward value is positively correlated with a performance or stability metric for the computer system. The metric may be a rate of instruction execution by the computer system (e.g., in millions of instructions per second, MIPS). Including performance and/or stability terms in the training of the software agent may help to guide the agent away from needlessly selecting security policies that dramatically impair system performance or stability, unless there is a strong security imperative for doing so.

The method further includes determining a cumulative reward value by accumulating (e.g., summing) a succession of immediate reward values determining for a respective succession of training iterations (e.g., since a beginning of the reinforcement learning). The software agent may be trained using the reinforcement learning to maximize the cumulative reward value. The cumulative reward value may be negatively correlated with how many anomalies have been detected by the anomaly detector during the reinforcement learning. The cumulative reward value may be positively correlated with an accumulated performance or stability metric for the computer system during the reinforcement learning.

It will be appreciated that the reward value may equivalently be expressed as a cost or penalty value (i.e., inverted), and the software agent may be trained to minimize such a cost value. Such implementations fall within the scope of the present disclosure.

Any software disclosed herein may include instructions for execution on one or more cores or processors. It may be stored on a non-transitory computer-readable storage medium, which may be a solid-state memory or a magnetic or optical storage medium. It may be stored in volatile memory (e.g., random access memory (RAM)) or non-volatile memory (e.g., flash memory, electrically erasable programmable read-only memory (EEPOM), read-only memory (ROM)). The software may be written in any language, e.g., C, C++, Java, etc. It may be compiled into machine code. The computer system may include one or more microprocessors. It may include memory, buses, internal peripherals, input/output peripherals, network interfaces, a power supply, etc. It may be an embedded system. It may be a server. It may be contained on a vehicle such as an aircraft, although this is not essential.

BRIEF DESCRIPTION OF THE DRAWINGS

Certain examples of the disclosure will now be described, by way of example only, with reference to the accompanying drawings in which.

DETAILED DESCRIPTION

Figure 1:
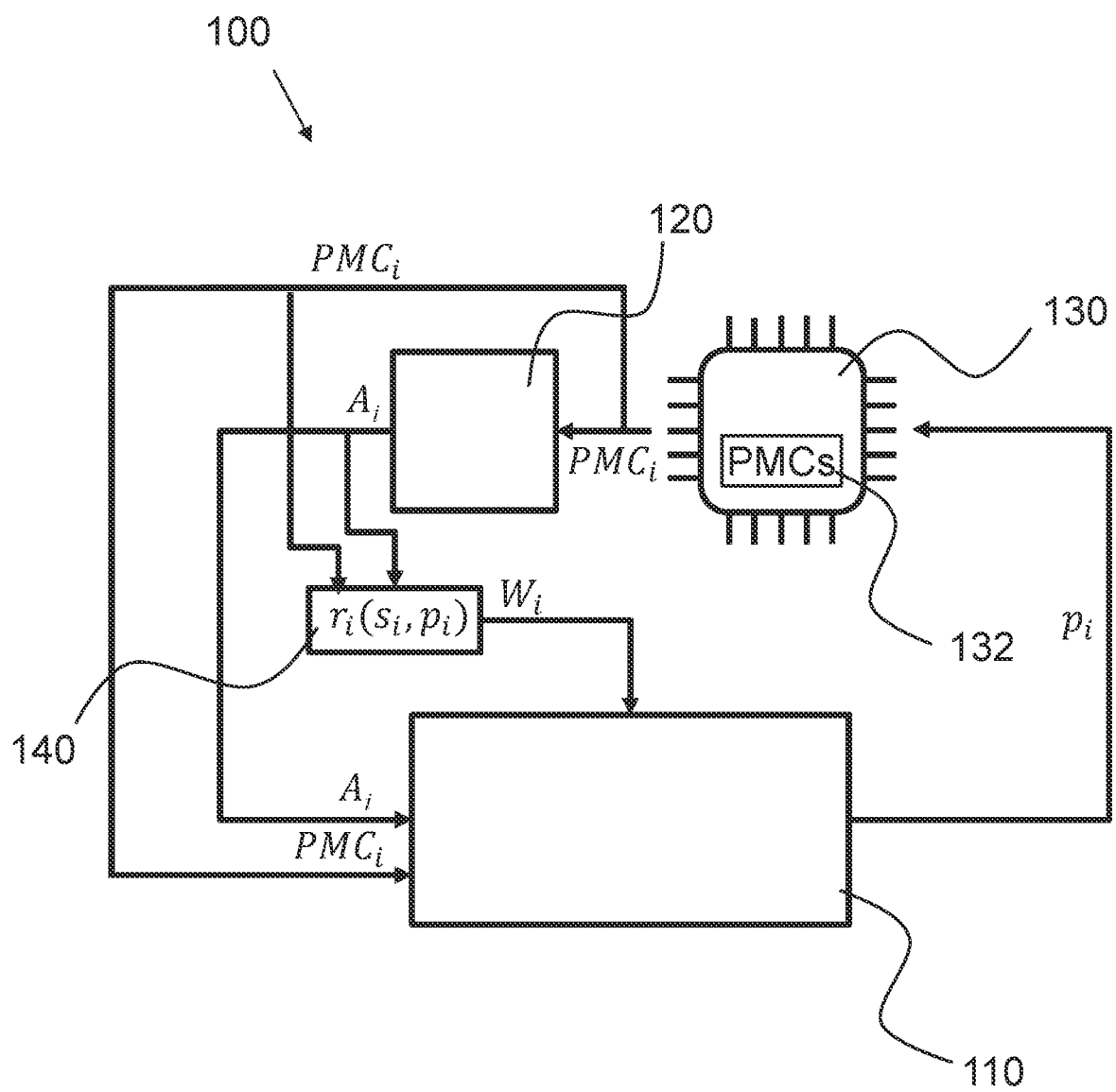
FIG. 1 shows a schematic diagram of a system for training a software agent.

FIG. 1 illustrates an exemplary computer system 100 for training a software agent 110 to protect a processor 130 from threats. The computer system 100 includes the software agent 110, an anomaly detector 120, the processor 130 (which may be a microcontroller or system-on-chip), and a model optimizer 140. The computer system 100 may have other components, such as random access memory (RAM), non-volatile storage, communication interfaces, etc., which may be within the processor 130 and/or external to it, which are omitted from the figures for the sake of simplicity.

The software agent 110 and anomaly detector 120 may be software components that are stored on a memory contained within, or coupled to, the processor 130, and that are executed by the processor 130. In other examples, it is possible they could be executed by a different processor from the target processor 130; however, executing them on the processor 130 may help the responsiveness of the software agent 110. The model optimizer 140 is only required for training and may be executed on a separate processor (not shown) from the target processor 130, or it may optionally be executed on the processor 130, e.g., being embedded within the software agent 110.

The processor 130 includes a set of performance monitoring counters (PMCs) 132 that are accessed by the software agent 110 and anomaly detector 120 in order to detect and respond to threats, such as malicious attacks or software faults. The processor 130 could be of any type, but in some examples it is a Zynq UltraScale+ MPSoC.

In some examples, the agent 110 implements a deep neural network, such as a quantized Deep Q Network (DQN) model. However, the agent 110 may implement any type of model that can be trained by reinforcement learning. Once trained by a method as disclosed herein, the agent 110 selects policies to be implemented by the processor 130 in order to mitigate risk from threats while also aiming to maintain the performance of the processor 130.

The anomaly detector 120 may include any type of software and/or hardware that can detect anomalies from PMC values generated by the processor 130. In some examples it is a constraint-based network model that has been trained to detect anomalies that may be indicative of a threat, such as a hardware or software attack against the processor 130.

Before being deployed to protect systems in the field, the software agent 110 is first trained by reinforcement learning to select appropriate policies. The reinforcement learning uses a reward function calculated by the model optimizer 140 within its feedback training loop. The agent 110 undergoes a plurality of training iterations, e.g., according to a method set out in FIG. 2.

During each iteration, i, the agent 110 receives an array of PMC values, $PMC_i$, from the PMCs 132. These PMC readings can include information relating to low level events within each of one or more cores of the processor 130, examples of which are given in the following table.

| PMC event | Description |
| --- | --- |
| Branch instructions | Number of branch instructions retired |
| Branch-misses | Number of branches mispredicted |
| Instructions | Number of instructions retired |
| Bus-cycles | Time to make a read/write between the CPU & memory |
| Cache misses | Number of last level cache misses |
| Cache-references | Number of last level cache references |
| L1-dcache-load-misses | Number of cache lines brought into L1 data cache |
| L1-dcache-loads | Number of retired memory load operations |
| L1-dcache-stores | Number of cache lines into L1 cache from DRAM |
| L1-icache-load-misses | Number of instruction misses in L1 instructions cache |
| Node-loads | Number of successful load operations to DRAM |
| Node-stores | Number successful store operations to DRAM |
| LLC-load-misses | Number of cache lines brought into L3 cache from DRAM |
| LLC-loads | Number of successful memory load operations in L3 |
| iTLB-load-misses | Number of misses in instruction translation lookaside buffer (TLB) during load operations |
| Branch-loads | Number of successful branches |

Live readings of the processor input voltage and temperature may also be provided as part of the PMC data.

The anomaly detector 120 provides the agent 110 with anomaly data, $A_i$, at least once each training iteration. However, the anomaly detector 120 may look for anomalies in the PMCs 132 once every training iteration, or at a faster rate. The anomaly data may take any form. It may be as simple as a binary flag signalling if an anomaly has been detected over an iteration period, or it may include a count of how many anomalies have been detected over an iteration period. It may be more complex, e.g., including information on what type of anomaly or anomalies have been detected. The anomaly detector 120 may also be explainable. At least in some examples, explainability information output by the anomaly detector 120 is used by the software agent 110 to better select what policy to enforce on the system. Explainability information generated by the anomaly detector 120 may also assist human experts to understand its outputs and adjust the system 100 in order to improve the training.

The PMCi and $A_i$ together represent the environmental state, $s_i$, for the reinforcement-learning training of the agent 110. In each training iteration, the agent 110 selects and then implements (on the processor 130) a policy, $p_i$ (which could include multiple actions), from a set of policies within the agent's 110 available action space. The selection is based on the current state, $s_i$, and is influenced by reward-based feedback that is used to update the agent 110 in each iteration. The policies available to the agent 110 are designed to target specific cores and/or memories (e.g., caches) and/or other elements of the processor 130. They can include disabling a core of the processor 130 and/or restricting access to one or many levels of cache memory within the processor 130, as well as re-enabling a disabled core and/or derestricting access to the cache memory (e.g., once a threat has gone away).

The model optimizer 140 receives both the PMC data $PMC_i$ and the anomaly data $A_i$ and, at each iteration, calculates an immediate reward value, $r_{i-1}(s_i,p_{i-1})$, to evaluate the effectiveness of the policy $p_{i-1}$ that the agent 110 selected that resulted in the present state $s_i$. This is used to train the agent 110 in a reinforcement-learning feedback process. The reward is calculated such that it is negatively correlated with the number of anomalies detected in the system, and is positively correlated with the available processing power provided by the processor 130. In examples where the agent 110 implements a neural network, updated model weights $W_i$ may then be applied by the model optimizer 140 to the agent 110, to adjust the model within the agent 110.

In some examples, the training process may reach a point at which the agent 110 is considered to have been sufficiently trained. The agent 110 may optionally then be cloned and deployed as a trained software agent 310 for protecting a computer system 300 that contains an identical or similar processor 130 and anomaly detector 120 to the training environment. The trained agent 310 may be intended to run continuously while the system 300 it is deployed into is in operation, without the assistance of any outside knowledge. However, in other examples, the training of the agent 110 may never stop, and may continue even after deployment. In such examples, the trained software agent 310 may continue to be further trained even after deployment.

Figure 2:
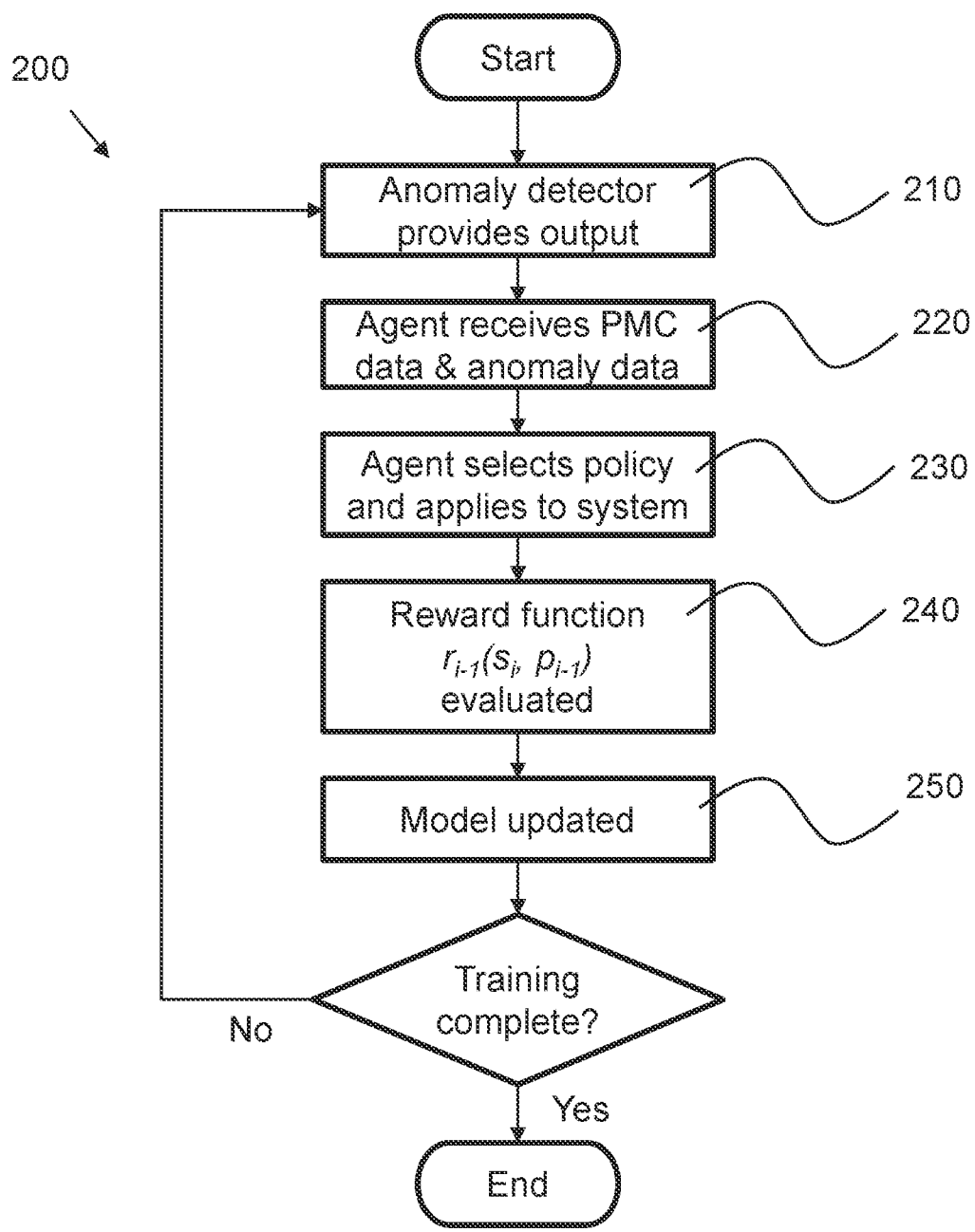
FIG. 2 shows a flowchart of steps of a method used in training the agent.

FIG. 2 is a flowchart illustrating a method of training an agent to appropriately respond to an anomaly in a computer system by using reinforcement learning. The method 200 will be described with respect to the computer system 100 of FIG. 1, although it may be performed by other devices or systems. Any methods described herein may include other steps not shown. During the training, the processor 130 is directed to conduct simulations that reproduce instances of normal behaviour and also instances of anomalous behaviour that emulate real-life scenarios, such as the mounting of a side-channel attack.

In a first step 210 of a training cycle, i, the anomaly detector 120 outputs anomaly data $A_i$ indicating whether it has detected any anomalies in the PMCs 132, and optionally including information on what types of anomalies have been detected.

In the next step 220, the software agent 110 collects PMC data $PMC_i$ from some or all of the PMCs 132 of the processor 130 and also receives the anomaly data $A_i$. These together define the state information, $s_i$, for the software agent 110. Counts of any or all of the PMC events in the table above may be included in the PMC data, as well as the current input voltage and temperature of the processor 130.

In a next step 230, the state information is used by the agent 110 to select a policy $p_i$ which it applies to the processor 130. According to at least some examples, the security policy is selected from a set of predetermined security policies. Such policies included within the policy list can include disabling a core of the processor 130, or restricting access to one or more levels of cache memory or other memory. In some examples, a policy may include applying an action for only a limited time duration, e.g., for two processor clock cycles, though this may be varied according to the need. Given that the agent 110 is being trained to deal with anomalies without unduly impacting the processing performance of the system, some policies that the agent 110 can select may undo an action of a previously-applied policy, such as enabling a disabled processor core. Any appropriate set of security policies can be provided for the agent 110 to select from, and the set of security policies can potentially be expanded according to the requirements of the use case.

The anomaly data and the PMC data from each iteration are also received by the model optimizer 140, which, in a next step 240, evaluates a predetermined reward function to calculate an immediate reward value, $r_i(s_i,p_i)$, representing how successful the agent 110 has been in reacting to earlier anomalies while preserving processor performance. In the very first iteration, there may be no meaningful anomaly detector output to consider. However, from the second iteration onwards, the model optimizer 140 can evaluate a reward value at each iteration that assesses the impact of the policy, $p_{i-1}$, selected in the preceding iteration. From the second iteration onwards, it thus evaluates the reward function as $r_{i-1}(s_i,p_{i-1})$. The immediate reward values from each training iteration may also be accumulated to determine a cumulative reward function R, which may also be updated by the model optimizer 140 at each iteration.

The reward function is a mathematical function that scores and conveys the accuracy of the policies applied by the agent. The agent 110 is penalised whenever the system suffers a detected anomaly (which may signify an avoidable attack) $A_i$ over the course of a training cycle. In order to avoid a scenario that the agent 110 learns to simply terminate all system processes to thwart a perceived attack, the reward function is positively correlated with a metric of processor performance, such that the agent 110 is incentivised to minimise any reduction in processor performance as a result of the policy it selects.

In some examples, the immediate reward function is of the form $$r_i(s_i, p_i) = \alpha \cdot \frac{\eta \cdot MIPS_i}{1 + \beta \cdot \sum_{j \in A_i} \gamma_j \cdot j}$$

where:
$MIPS_i$ is a measure of millions of instructions per second;
$A_i$ identifies the number of anomalies detected in state $s_i$;
j identifies different anomaly types; and
$\alpha, \beta, \gamma_j, \eta$, are adaptable parameters/weights.

A cumulative reward value may be calculated as:

$$R = \sum_i r_i(s_i, p_i)$$

-continued $$= \sum_i \left( \alpha \cdot \frac{\eta \cdot MIPS_i}{1 + \beta \cdot \sum_{j \in A_i} \gamma_j \cdot j} \right)$$

$$= \alpha \cdot \sum_i \left( \frac{\eta \cdot MIPS_i}{1 + \beta \cdot \sum_{j \in A_i} \gamma_j \cdot j} \right)$$

The cumulative reward function allows the agent 110 to consider the long-term effects of its policy selections. However, it is not necessary that the reward function take this form in all examples; additional parameters may be added, or the parameters shown here may be adapted or dispensed with in order to fit the desired use case.

In a further step 250, the model optimizer 140 uses the reward value to optimise the model (e.g., by calculating updated model weights $W_i$ in examples where the model implements a neural network). This optimising adjusts the agent's behaviour in subsequent iterations.

If the training is determined to be incomplete, the method returns to step 210 and repeats until sufficient training iterations have been completed. Once training is deemed complete, the final weights may be used to generate a trained version 310 of the software agent 110 for deployment. However, in some other examples, training may never end and may instead be performed continually even while the software agent 110 has been deployed to protect a computer system.

Figure 3:
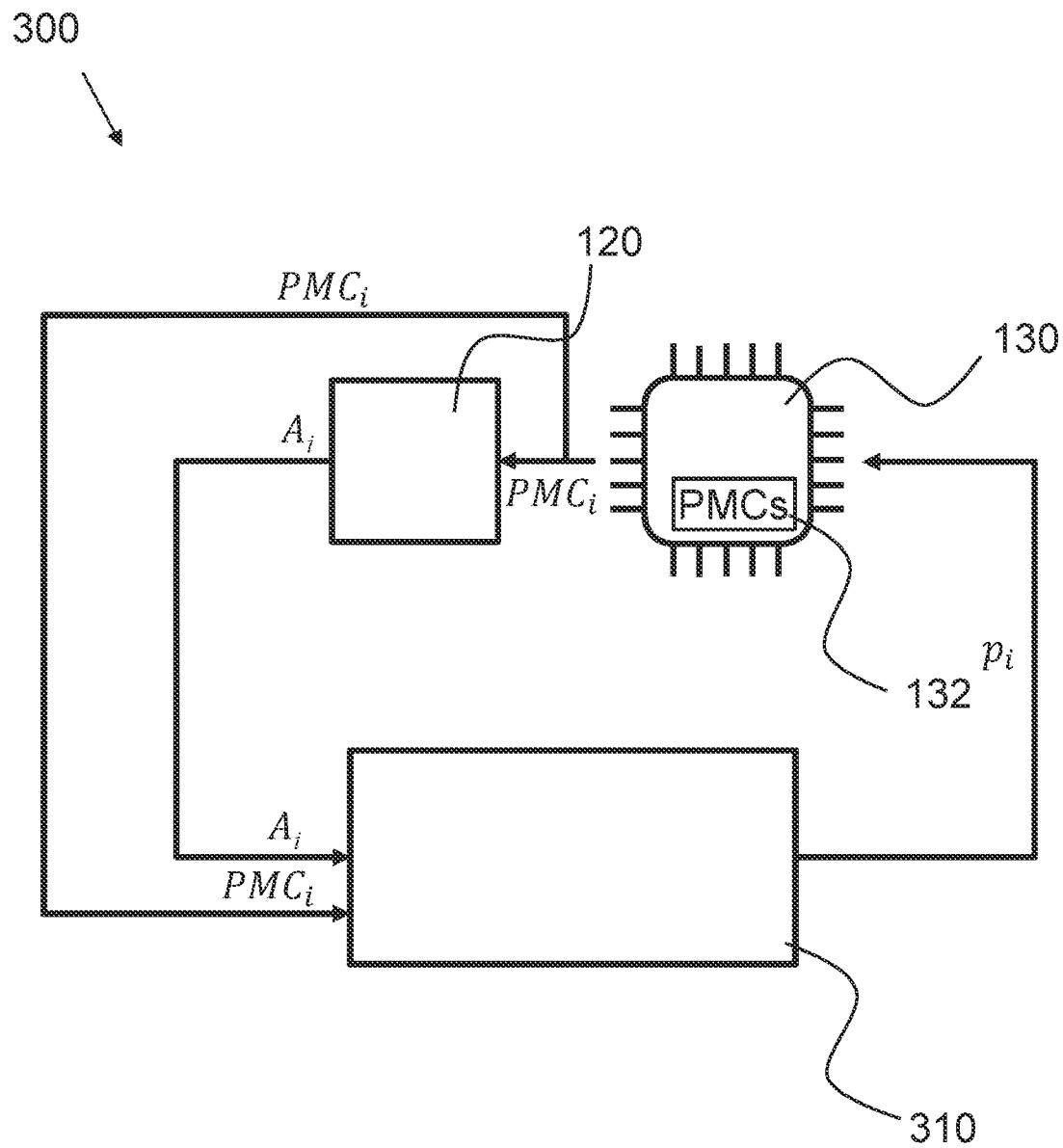
FIG. 3 shows a schematic diagram of a computer system containing the trained software agent.

FIG. 3 illustrates a computer system 300 that includes the trained agent 310. The system 300 is similar to the system 100 of FIG. 1, except that it does not require the model optimizer 140. The trained agent 310 can accurately and efficiently respond to anomalous behaviour based on the received PMC data, $PMC_i$ and on the output $A_i$ of the anomaly detector 120.

The created framework advantageously allows for a highly adaptable automated or semi-automated method for anomaly detection and mitigation. For example, the deployed agent 310 is capable of receiving state data $s_i$ and independently selecting a security policy $p_i$, or succession of policies, that efficiently mitigates the threat while also minimising any reduction in system performance.

In some examples, as explained above, the anomaly detector 120 is capable of providing interpretable information about the anomalies detected on the observable PMCs 132 of the system, and the agent 110 uses this information to select the most appropriate policies to mitigate the anomalies.

In some variant examples, it's possible the agent 110 might be arranged not to receive anomaly data from the anomaly detector, but only PMC data, with the anomaly data being used by the model optimizer to train the agent 110 to detect and respond to anomalies. In such examples, the anomaly detector might potentially be omitted from the deployed system containing a trained agent 310, which may instead be sufficiently intelligent as to infer anomalies directly from the PMC data.

It will be appreciated by those skilled in the art that the disclosure has been illustrated by describing several specific examples thereof, but is not limited to these examples; many variations and modifications are possible within the scope of the accompanying claims.

The invention claimed is:

1. A computer-implemented method of training a software agent for protecting a computer system, the method comprising:

receiving performance monitoring counter (PMC) data comprising data from one or more hardware performance monitoring counters (PMCs) of the computer system;

receiving an output from an anomaly detector that detects anomalies in the computer system, wherein the anomaly detector processes the PMC data to detect the anomalies using at least one of an algorithm or a trained machine learning model;

providing state data to the software agent, wherein the state data comprises at least the PMC data;

operating the software agent to select a security policy from a set of security policies in dependence upon the state data;

applying the selected security policy to the computer system;

evaluating a reward function to determine a reward value, wherein the reward value depends on at least the output of the anomaly detector; and using the reward value to train the software agent using reinforcement learning for selecting security policies from the set of security policies.

2. The method of claim 1, wherein the PMC data comprises data from a respective set of one or more hardware PMCs of each of one or more processors or cores of the computer system.

3. The method of claim 1, wherein the PMC data comprises at least one of:
cache access, RAM access, branch prediction, or bus timing.

4. The method of claim 1, wherein the selected security policy affects one or more cores or processors of the computer system, including at least one processor from which at least some of the PMC data was received.

5. The method of claim 1, wherein the selected security policy restricts the performance of at least one processor of the computer system.

6. The method of claim 1, wherein applying the selected security policy comprises one of shutting down or throttling the performance of a core or processor of the computer system, or preventing or limiting access to a portion of memory of the computer system.

7. The method of claim 1, wherein the anomaly detector is configured to detect one or more different types of hardware or software attacks or faults.

8. The method of claim 1, wherein the anomaly detector receives data from one or more hardware PMCs of the computer system and processes the data to detect anomalies in the computer system.

9. The method of claim 1, wherein the anomaly detector outputs how many and/or what types of anomalies have been detected since a security policy selected from the set of security policies was applied, and wherein the reward value depends upon how many and/or what types of anomalies have been detected by the anomaly detector.

10. The method of claim 1, wherein state data provided to the software agent additionally comprises an output of the anomaly detector, and wherein the software agent uses the output of the anomaly detector and the PMC data to select the security policy from the set of security policies.

11. The method of claim 1, wherein the software agent implements a deep neural network or a quantized Deep Q-Network (DQN).

12. The method of claim 1, comprising training the software agent over a plurality of training iterations, wherein, in every training iteration: the state data is updated;

an output is received from the anomaly detector; the software agent selects a security policy to be applied; and the reward function is evaluated.

13. The method of claim 1, wherein the reward function is such that the reward value is negatively correlated with how many anomalies have been detected by the anomaly detector since the selected security policy was applied to the computer system.

14. The method of claim 1, wherein the reward function is such that the reward value is positively correlated with a performance or stability metric for the computer system.

15. The method of claim 14, wherein the reward function is such that the reward value is positively correlated with a rate of instruction execution by the computer system.

16. A non-transitory computer-readable medium storing computer software for protecting a computer system, wherein the computer software comprises instructions which, when executed, provide a software agent that has been trained by a method comprising:
   receiving performance monitoring counter (PMC) data comprising data from one or more hardware performance monitoring counters (PMCs) of the computer system;
   receiving an output from an anomaly detector that detects anomalies in the computer system, wherein the anomaly detector processes the PMC data to detect the anomalies using at least one of an algorithm or a trained machine learning model;
   providing state data to the software agent, wherein the state data comprises at least the PMC data;
   operating the software agent to select a security policy from a set of security policies in dependence upon the state data;
   applying the selected security policy to the computer system;
   evaluating a reward function to determine a reward value, wherein the reward value depends on at least the output of the anomaly detector; and
   using the reward value to train the software agent using reinforcement learning for selecting security policies from the set of security policies.

17. The non-transitory computer-readable medium of claim 16, wherein the software agent comprises instructions for:
   receiving state data comprising at least performance monitoring counter (PMC) data comprising data from one or more hardware performance monitoring counters (PMCs) of a computer system; and
   selecting, in dependence upon the received state data, a security policy for applying to the computer system from the set of security policies.

18. The non-transitory computer-readable medium of claim 16, wherein the computer software further comprises the anomaly detector, and wherein the software agent comprises instructions for selecting the security policy for applying to the computer system in dependence upon the received PMC data and further upon an output of the anomaly detector.

19. The non-transitory computer-readable medium of claim 16, wherein the computer software further comprises instructions for further training the software agent while the software agent is protecting the computer system.

20. A computer system comprising one or more hardware performance monitoring counters (PMCs) and further comprising a memory storing computer software comprising instructions which, when executed, provide a software agent that has been trained by a method comprising:
   receiving PMC data comprising data from the one or more hardware PMCs of the computer system;
   receiving an output from an anomaly detector that detects anomalies in the computer system, wherein the anomaly detector processes the PMC data to detect the anomalies using at least one of an algorithm or a trained machine learning model;
   providing state data to the software agent, wherein the state data comprises at least the PMC data;
   operating the software agent to select a security policy from a set of security policies in dependence upon the state data;
   applying the selected security policy to the computer system;
   evaluating a reward function to determine a reward value, wherein the reward value depends on at least the output of the anomaly detector; and
   using the reward value to train the software agent using reinforcement learning for selecting security policies from the set of security policies.

* * * * *